United States Patent [19]

Pfundstein

[11] Patent Number: 5,561,853
[45] Date of Patent: Oct. 1, 1996

[54] METHOD AND APPARATUS FOR DETERMINING THE ASSIGNMENT OF A MOBILE STATION TO EQUIPMENT LISTS

[75] Inventor: Matthias Pfundstein, Stuttgart, Germany

[73] Assignee: Alcatel SEL Aktiengesellschaft, Stuttgart, Germany

[21] Appl. No.: 329,511

[22] Filed: Oct. 26, 1994

[30] Foreign Application Priority Data

Oct. 29, 1993 [DE] Germany .......................... 43 36 995.2

[51] Int. Cl.$^6$ ..................................... H04B 1/00
[52] U.S. Cl. ..................... 455/54.1; 379/62; 340/825.34; 380/25
[58] Field of Search .................. 455/53.1, 33.1, 455/54.1, 54.2, 33.4, 56.1; 379/59, 62, 63; 340/825.34; 380/23, 25

[56] References Cited

U.S. PATENT DOCUMENTS

| | | | |
|---|---|---|---|
| 5,123,111 | 6/1992 | Delory et al. | 455/34.1 |
| 5,361,396 | 11/1994 | Onoe et al. | 455/33.4 |
| 5,375,251 | 12/1994 | Pfundstein | 455/33.4 |
| 5,420,908 | 5/1995 | Hodges et al. | 379/58 |
| 5,448,760 | 9/1995 | Frederick | 455/56.1 |
| 5,450,405 | 9/1995 | Maher et al. | 370/58.2 |

FOREIGN PATENT DOCUMENTS

| | | |
|---|---|---|
| 0464425 | 6/0000 | European Pat. Off. . |
| 3036380 | 5/1982 | European Pat. Off. . |
| 0163358 | 12/1987 | European Pat. Off. . |
| 2659622 | 5/1978 | Germany . |

(List continued on next page.)

OTHER PUBLICATIONS

Joseph, Pierre, Oliver: GSM: Globales System fur mobile Kommunikation. In: ascom, Technishe Mittei–lungen Feb. 1991, S. 3–8.

Shanley, Marie: Radio Security Feature. INpMotorola, Technical Developments, vol. 8, 1988, S–36–37.
FTICE JOURNAL, NR. 4, Oct. 1991, Belgium, pp. 33–36, "The Equipment Identity Register" by Loix.
Electrical Communication, Nr. 2, Apr. 1993, Paris Fr. pp. 141–154, Feldmann et al "GSM Network Systems and Overall System Integration".

*Primary Examiner*—Reinhard J. Eisenzopf
*Assistant Examiner*—Lee Nguyen
*Attorney, Agent, or Firm*—Ware, Fressola, Van Der Sluys & Adolphson

[57] ABSTRACT

In the prior art, equipment lists (B, G, W) are searched successively, or a list is searched which contains all equipment numbers ($MEI_1$ to $MEI_n$) along with the respective equipment lists to which they are assigned. Thus mobile stations ($MEI_1$ to $ME_n$) are assigned to one of several equipment lists (B, G, W; black, grey, white list). This assignment must be checked by the mobile switching center (MSC) prior to the establishment of a connection. The present method uses an algorithm where each equipment number ($MEI_1$ to $MEI_n$) is assigned a search key ($KEY_1$ to $KEY_p$; KEY) such that groups of equipment numbers ($MEI_1$ to $MEI_n$) correspond with a respective one of the search keys ($KEY_1$ to $KEY_p$; KEY), and that the search key ($KEY_1$ to $KEY_p$; KEY) covers a number of different structural elements ($S_1$ to $S_q$; DAT). In a corresponding apparatus for determining the assignment of a mobile station ($ME_1$ to $ME_n$) to equipment lists (B, G, W) containing a number of equipment numbers ($MEI_1$ to $MEI_n$), a memory device (MEM) has as a memory device for different structural elements ($S_1$ to $S_q$; DAT), and the controller is provided with a converting device (GEN) for generating a search key ($KEY_1$ to $KEY_p$; KEY) from an equipment number ($MEI_1$ to $MEI_n$), with a comparator (COMP) for determining the association of an equipment number ($MEI_1$ to $MEI_n$) with a structural element ($S_1$ to $S_q$; DAT), and has an access device (ACC) for reading different structural elements ($S_1$ to $S_q$; DAT) from the memory device (MEM), the access device (ACC) being designed to access the structural elements ($S_1$ to $S_q$; DAT) by means of a search key ($KEY_1$ to $KEY_p$; KEY).

8 Claims, 4 Drawing Sheets

FOREIGN PATENT DOCUMENTS

| | | |
|---|---|---|
| 3405381 | 8/1985 | Germany . |
| 3410937 | 10/1985 | Germany . |
| 3448393 | 10/1985 | Germany . |
| 3417421 | 11/1985 | Germany . |
| 3431726 | 3/1986 | Germany . |
| 3527330 | 2/1987 | Germany . |
| 4118849 | 12/1992 | Germany . |
| 4239271 | 10/1993 | Germany . |
| 0058458 | 2/1990 | Japan ................................. 379/62 |
| 9101067 | 1/1991 | WIPO . |
| 9207429 | 4/1992 | WIPO . |

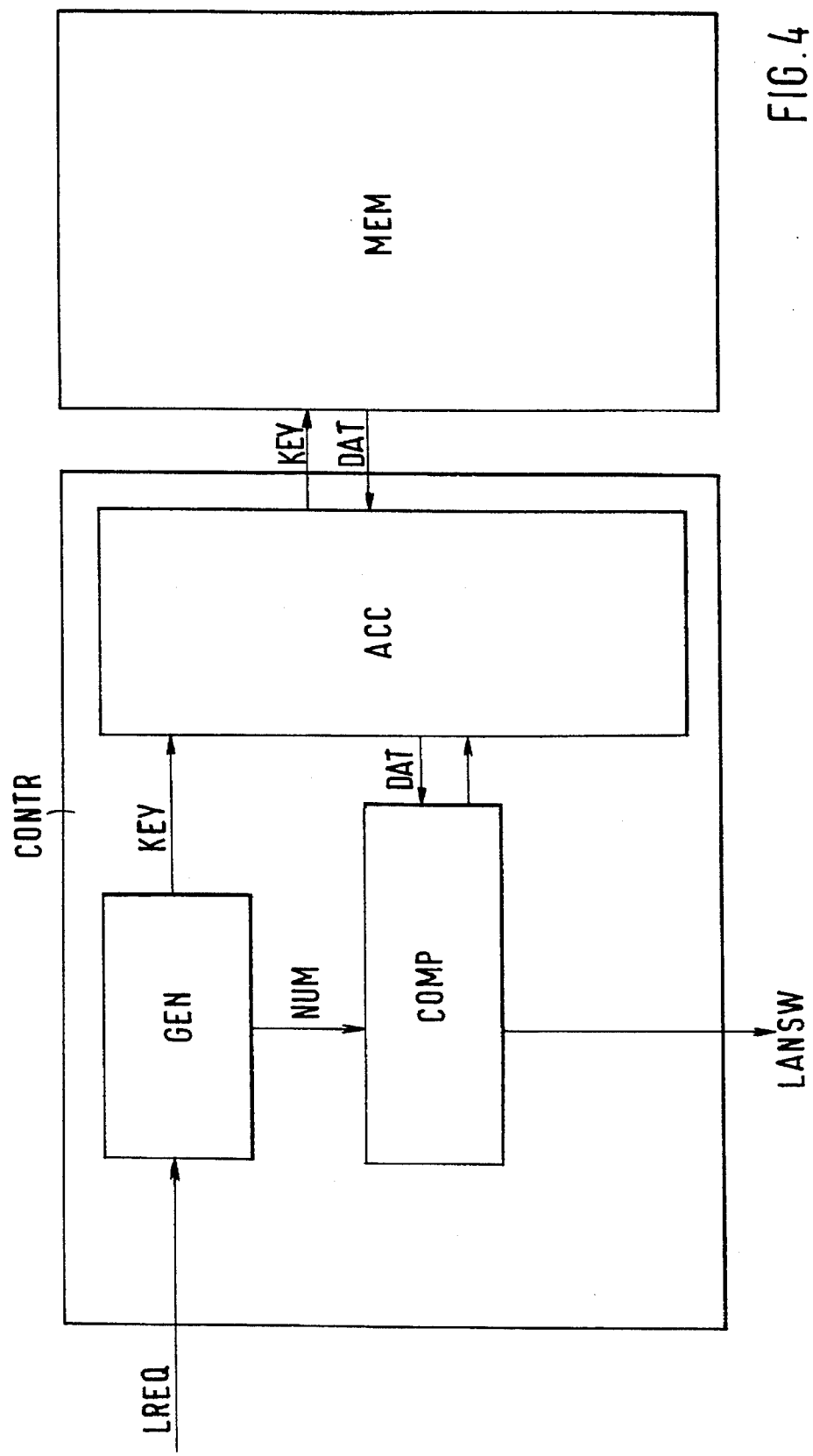

METHOD AND APPARATUS FOR DETERMINING THE ASSIGNMENT OF A MOBILE STATION TO EQUIPMENT LISTS

TECHNICAL FIELD

The present invention relates to a method for determining the assignment of a mobile station to equipment lists, and to apparatus for determining the assignment of a mobile station to equipment lists.

BACKGROUND OF THE INVENTION

Such a method is used, for example, in GSM mobile-radio systems (GSM=Global System for Mobile Communications).

There, each mobile station has a mobile equipment identity number allocated to it, the IMEI. This equipment number can be requested by the respective mobile switching center (MSC).

The mobile switching centers, in turn, have an equipment identity register (EIR), which contains data about, e.g., mobile stations that have been reported stolen.

Before establishing a connection for a mobile-radio subscriber, the mobile switching center requests the equipment number of the subscriber's mobile station. Then it checks by means of the equipment identity register whether the mobile station has been reported stolen or not. If it has been stolen, the mobile switching center will refuse to set up the call.

In a book by M. Mouly and M. B. Pautet, "The GSM System for Mobile Communications", ISBN Number 2-9507190-0-7, the structure of such an equipment identity register is explained in the chapter entitled "Mobile Equipment Management".

Three lists, referred to as "white list", "grey list", and "black list", are stored in the equipment identity register.

The white list contains ranges of equipment numbers of mobile stations which operate properly and have not been stolen. The black list contains equipment numbers for mobile stations which have been stolen or do not operate properly. The grey list contains equipment numbers for mobile stations whose status has not been finally determined, i.e., for example, before black-listing is imposed.

How these lists are stored in the equipment identity register and how they are searched for a given equipment number is not described.

In general, there are two possibilities:

One is to search the equipment lists successively for a given equipment number.

The other is to create a common list which contains all equipment numbers along with the respective equipment list to which they are assigned. Such a list may be sorted according to a particular criterion, whereby the search for a given equipment number is speeded up.

Since each mobile station is provided with an equipment number, the total of equipment numbers is very large. This results in large data sets for each of the above-described possibilities, which require much storage space and in which the search for an equipment number takes relatively long.

SUMMARY OF THE INVENTION

It is the object of the invention to determine which equipment list a mobile station is assigned to.

The invention takes account of the recognition that the assignment of equipment numbers to equipment lists is not completely random. For example, adjacent equipment numbers frequently belong to the same equipment list, preferably to the white list. The equipment numbers of the black list mostly stand alone. Thus, when assigning equipment numbers to equipment lists, these differing characteristics should be taken into account.

The fundamental idea of the invention is to describe the assignment of the equipment numbers to the equipment lists by means of structural elements, and to access the structural elements by means of search keys. A structural element is a data structure which assigns an equipment number or a range of equipment numbers to an equipment list. A search key addresses several of these structural elements. This also has the advantage that equipment numbers can be represented in the structural elements in shortened form, since the search key already represents part of the address of an equipment number.

The invention thus offers the advantage that through the use of structural elements and search keys, the size of a data set required to represent the assignment of the equipment numbers to the equipment lists is reduced. The use of search keys also speeds up the search for a given equipment number, since the range of numbers to be searched is greatly reduced.

BRIEF DESCRIPTION OF THE DRAWINGS

The invention will become more apparent from the following description of two embodiments when taken in conjunction with the accompanying drawings, in which:

FIG. 4 is a symbolic representation of a novel apparatus for determining the assignment of a mobile station to equipment lists for a second embodiment.

BEST MODE FOR CARRYING OUT THE INVENTION

In a first embodiment, the use of the novel method in a GSM mobile-radio system will be described, in which mobile stations are assigned to three different equipment lists.

It is also possible to apply the novel method to other mobile-radio systems or to another number of equipment lists.

Figure 1:
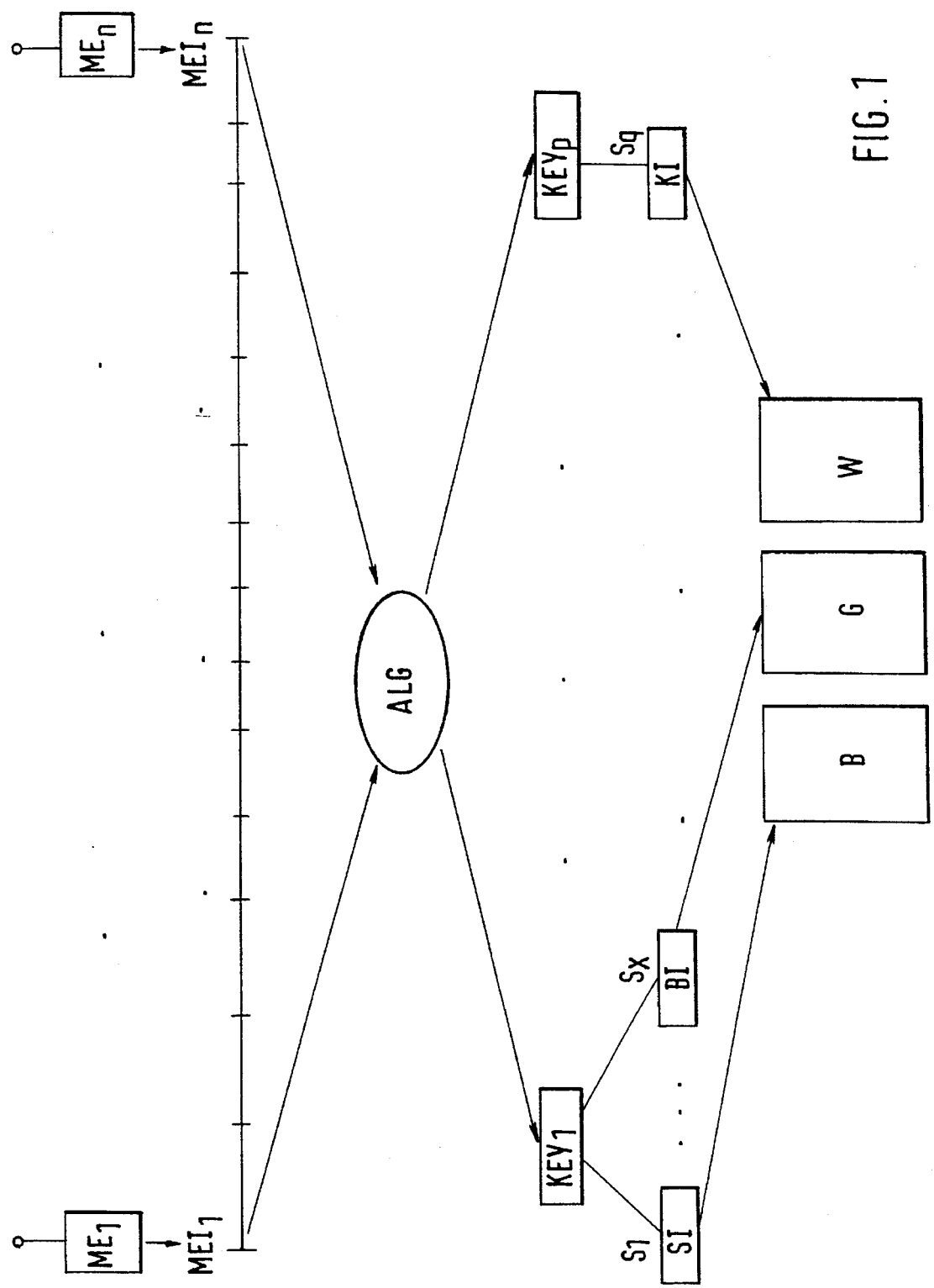
FIG. 1 is a schematic representation of a data structure for a first embodiment.

FIG. 1 shows a plurality of mobile stations $ME_1$ to $ME_n$, a plurality of equipment numbers $MEI_1$ to $MEI_n$, a plurality of search keys $KEY_1$ to $KEY_p$, a plurality of structural elements $S_1$ to $S_q$, and three equipment lists W, G, and B.

Each of the mobile stations $ME_1$ to $ME_n$ has one of the equipment numbers $MEI_1$ to $MEI_n$ uniquely allocated thereto. This is achieved, for example, by issuing consecutive numbers to the mobile stations $ME_1$ to $ME_n$ during production, and storing the allocated number in a read-only memory incorporated in the mobile' stations $ME_1$ to $ME_n$.

The search keys $KEY_1$ to $KEY_p$ each serve to assign a respective part of the equipment numbers $MEI_1$ to $MEI_n$ to one data set. Each of the search keys $KEY_1$ to $KEY_p$ thus addresses one data set.

Each of the structural elements $S_1$ to $S_q$ assigns a respective one of the equipment numbers $MEI_1$ to $MEI_n$ or a subset thereof to one of the equipments lists W, G, and B. There are three different sorts of structural elements. They differ in how they assign equipment numbers to one of the equipment lists W, G, and B. A first sort SI assigns an equipment number to one of the equipment lists W, G, and B. A second sort BI assigns a whole range of consecutive equipment numbers to one of the equipment lists, and a third sort KI assigns all equipment numbers addressed by one search key.

It is also possible to use other sorts of structural elements or another number of sorts.

The equipment numbers $MEI_1$ to $MEI_n$ are mapped onto the search keys $KEY_1$ to $KEY_p$ by an algorithm ALG, with groups of equipment numbers $MEI_1$ to $MEI_n$ corresponding with a respective one of the search keys $KEY_1$ to $KEY_p$. Each of the equipment numbers $MEI_1$ to $MEI_n$ is mapped onto only one of the search keys $KEY_1$ to $KEY_p$.

By means of a search key it is possible to access a data set consisting of one or more structural elements. The data set may also contain two dr more different sorts of structural elements. In the structural elements, the assignment to the equipment lists W, G, and B is then given.

The structural element $S_x$, which is addressed by the search key $KEY_1$ and belongs to the sort BI, thus assigns an entire range of equipment numbers to the equipment list G. At the same time, the structural element S1, which is also addressed by the search key $KEY_1$, assigns a single equipment number to the equipment list B. The structural element S1 belongs to the sort SI. The search key $KEY_1$ also addresses several other structural elements. The search key $KEY_p$ addresses only a single structural element, the structural element $S_q$. The structural element $S_q$ belongs to the sort KI and assigns all equipment numbers which are mapped onto the search key $KEY_p$ to the equipment list W.

The mapping of an equipment number onto a search key by the algorithm ALG will now be explained in more detail with the aid of FIG. 2.

Figure 2:
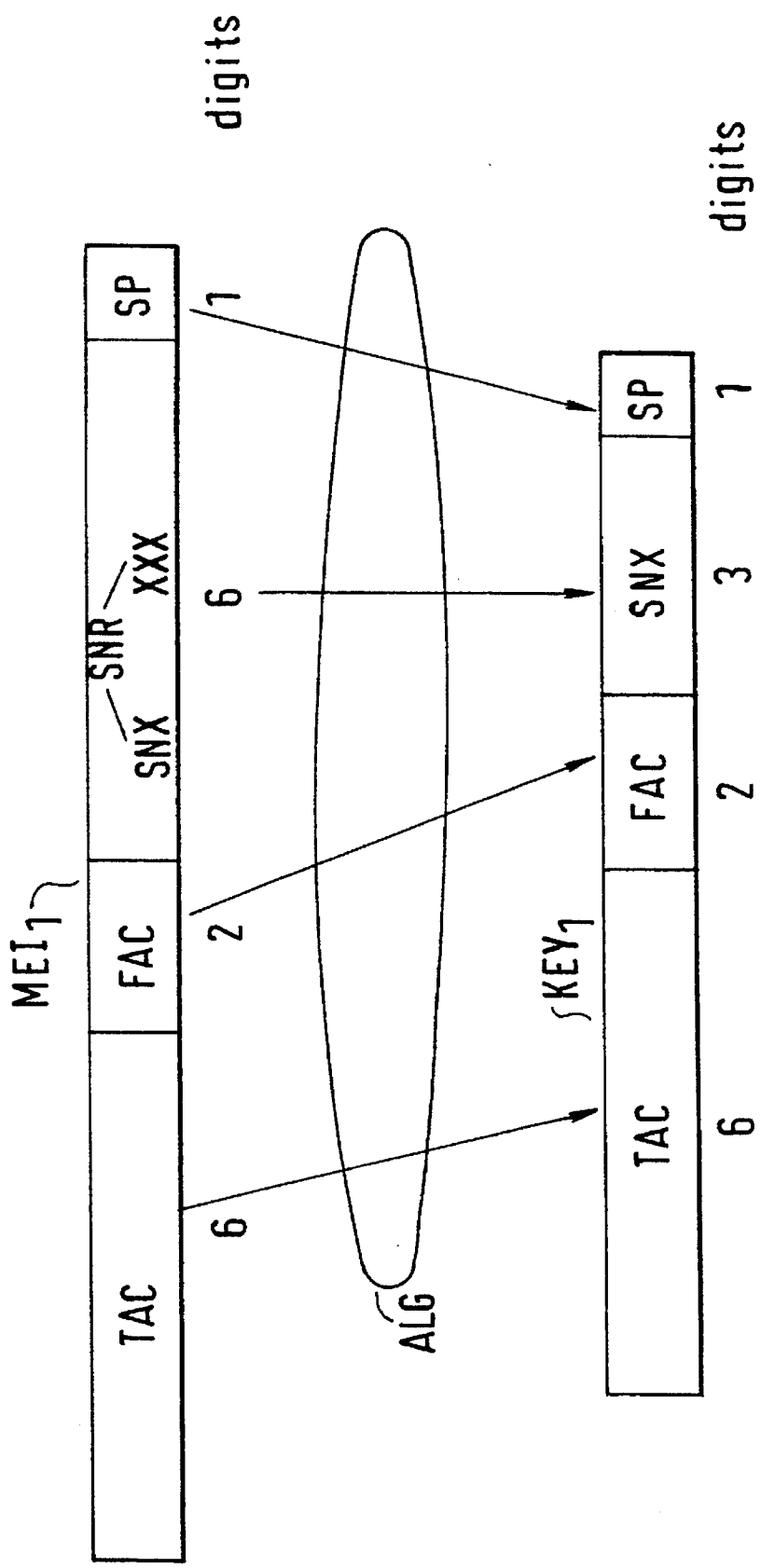
FIG. 2 is a symbolic representation of the structure of an equipment number according to the GSM standard and of a search key for the data structure of FIG. 1.

FIG. 2 shows the equipment number $MEI_1$ and the search key $KEY_1$.

The equipment number $MEI_1$ consists of three codes TAC, FAC, and SP and a serial number SNR. TAC is a six-digit type approval code which identifies the country in which the mobile station was produced. FAC is a two-digit code used as an identification of the final assembly plant. The serial number SNR is a manufacturer-specific six-digit number. SP (spare) is a single digit to which no meaning has been assigned yet.

Thus the equipment number $MEI_1$ is a 15-digit decimal number which is represented in an 8-byte value.

The search key $KEY_1$ consists of four codes TAC, FAC, SP, and SNX. SNX is a three-digit code which is generated from the serial number SNR by the algorithm ALG. Thus the search key $KEY_1$ is a 12-digit number and is represented in a 5-byte value.

The algorithm ALG generates the search $KEY_1$ by transferring the codes TAC, FAC, and SP from the equipment number $MEI_1$ and converting the serial number SNR into the code SNX. To do this, it deletes the last three digits of the serial number SNR, shortening it to three digits.

Thus, blocks of one thousand equipment numbers are mapped onto the respective search keys.

The equipment number $MEI_1$ or the search key $KEY_1$ may also have another composition or length. According to the American mobile-radio standard, for example, an equipment number consists of only 11 digits and can be processed on the same principle.

It is also possible to use another algorithm ALG to convert the equipment number $MEI_1$ into the search key $KEY_1$. The code SP could be incorporated, for example.

The data structure with the aid of which the search key $KEY_1$ accesses the individual structural elements will now be explained by way of example with the aid of FIG. 3. It is a variable-length data structure whose length depends on the number of structural elements corresponding with the search key $KEY_1$.

Figure 3:
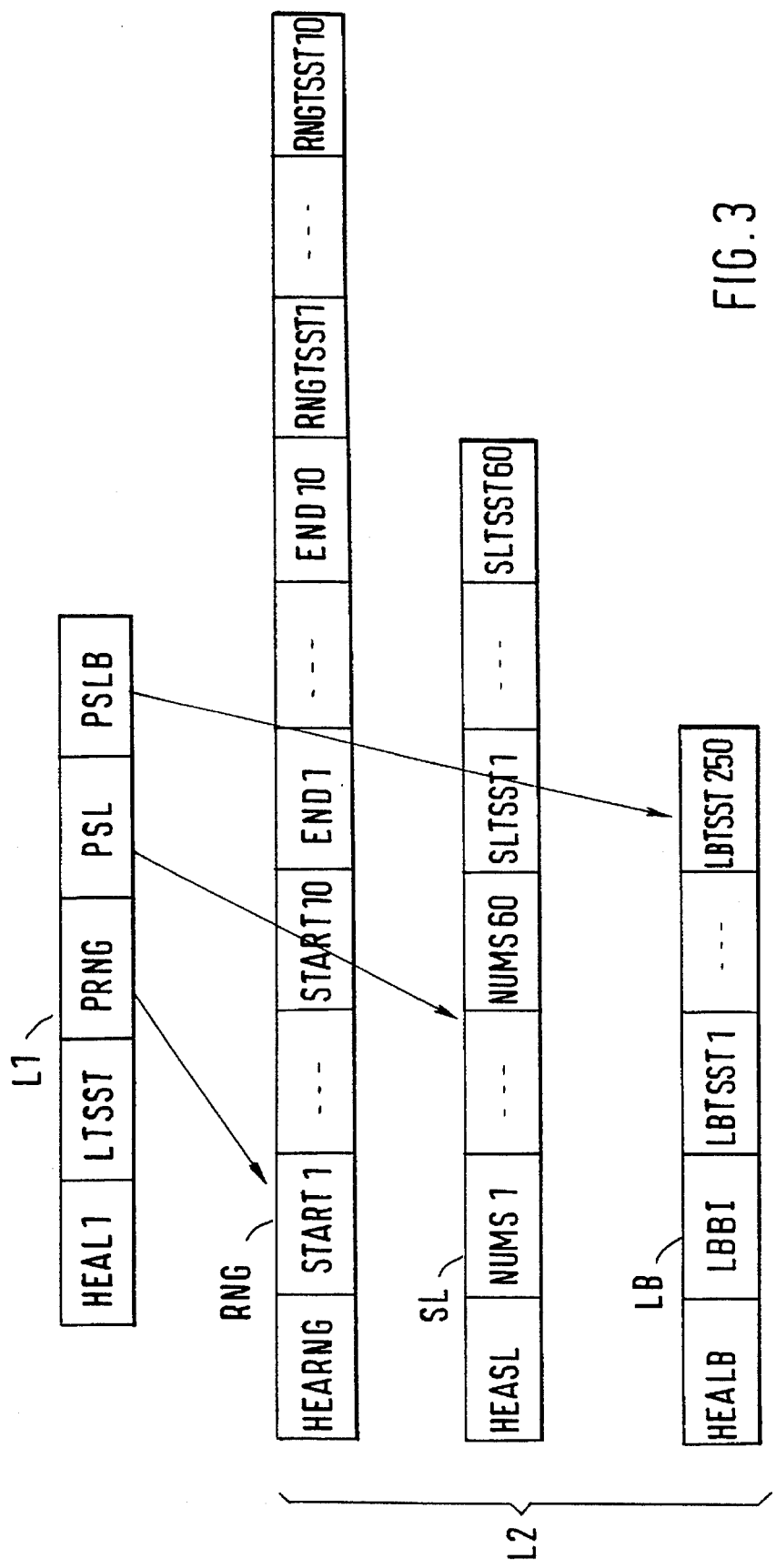
FIG. 3 is a symbolic representation of several structures for a first embodiment.

FIG. 3 shows four structures L1, RNG, SL, and LB. The structure L1 always forms part of the data set. The other three structures RNG, SL, and LB belong to a structure group L2 and can be linked with the structure L1 if required.

The structure L1 contains a structure head HEAL1, three pointers PRNG, PSL, and PSLB, and a status element LTSST. The structure head HEAL1 includes the associated search key $KEY_1$ as data-set key.

The pointers PRNG, PSL, and PSLB serve to link the structure L1 with the structures RNG, SL, and LB of the structure group L2.

The status element LTSST contains two kinds of information. Firstly, it either assigns all equipment numbers of the search key $KEY_1$ to the equipment list W or refers to the linkage with further structures from the structure group L2. Secondly, it carries a time stamp.

In the event that all equipment numbers of the search key $KEY_1$ are assigned to the equipment list W, the time of this assignment or of the latest confirmation of this assignment is included on that list. In that case, the status element LTSST represents a structural element of the sort KI in the structure L1 which assigns all equipment numbers mapped onto the search key $KEY_1$ to the equipment list W.

The structure RNG contains a structure head HEARNG, ten start elements START 1 to START 10, ten end elements END 1 to END 10, and ten status elements RNGTSST 1 to RNGTSST 10.

The structure head HEARNG serves, inter alia, to link the structure RNG with further structures which are arranged in the same pattern as the structure RNG.

The start elements START 1 to START 10 and the end elements END 1 to END 10 each contain a three-digit number. This number corresponds to the three end digits of the serial number SNR which were deleted by the algorithm ALG when the serial number was mapped onto the search key KEY.

Thus, by linking this three-digit number and the search key $KEY_1$ by the inverse of the algorithm ALG, the equipment number $MEI_1$ is obtained again.

The status elements RNGTSST 1 to RNGTSST 10 contain two kinds of information. They contain an assignment to the equipment lists W, G, and B as well as a time stamp which indicates the time of the assignment or of the last confirmation of the assignment.

The assignment is unique, i.e., each of the status elements is assigned to only one of the lists W, G, and B.

In the structure RNG, the start element START 1, the end element END 1, and the status element RNGTSST 1 together form a structural element of the sort BI. Their assignment to one of the equipment lists B, G, and W is effected by the status element RNGTSST 1. The start element START 1 and the end element END 1 specify the range of consecutive equipment numbers which is assigned.

The start element START 1 and the search key KEY$_1$ describe the beginning of this range, and the end element END 1 and the search key KEY$_1$ describe the end.

In the same way, the remaining start elements START 2 to START 10, end elements END 2 to END 10, and status elements RNGTSST 2 to RNGTSST 10 form structural elements of the sort BI in the structure RNG.

Thus, the structure RNG combines a group of ten structural elements of the sort BI. If further structural elements of the sort BI are needed, further structures arranged in the same pattern as the structure RNG may be linked with the structure RNG.

The structure SL contains a structure head HEASL, sixty number elements NUMS 1 to NUMS 60, and sixty status elements SLTSST 1 to SLTSST 60.

The structure head HEASL serves, inter alia, to link the structure SL with further structures arranged in the same pattern as the structure SL.

The number elements NUMS 1 to NUMS 60 each contain a three-digit number from which an equipment number can be reproduced as in the case of the start elements START 1 to START 20 or the end elements END 1 to END 20.

The status elements SLTSSt 1 to SLTSST 60 are constructed in the same way as the status elements RNGTSST 1 to RNGTSST 10.

The number elements NUMS 1 and the status element SLTSST 1 together form a structural element of the sort SI in the structure SL. The status element SLTSST 1 assigns the equipment number described by the number elements NUMS 1 and the search key KEY$_1$ to one of the three equipment lists W, G, and B.

In the same way, the remaining number elements NUMS 2 to NUMS 60 and status elements SLTSST 2 to SLTSST 60 form, in pairs, structural elements of the sort SI. The structure SL thus combines a group of 60 structural elements of the sort SI.

The structure LB contains a structure head HEALB, a block index LBBI, and 250 status elements LBTSST 1 to LBTSST 250.

The structure head HEALB serves, inter alia, to link the structure LB with further structures which are arranged in the same pattern as the structure LB.

The range of values of the block index LBBI covers the numbers zero to three. The status elements LBTSST 1 to LBTSST 250 are constructed in the same way as the status elements RNGTSST 1 to RNGTSST 10.

The equipment number to which one of the status elements RNGTSST 1 to RNGTSST 10 is assigned is described by the search key KEY$_1$, the index (structure position) of the status element, and the block index LBBI as follows. The block index LBBI is multiplied by 250, and to this number the index of the status elements is added. The result stands for the position of the equipment number within the equipment-number block addressed by the search key KEY$_1$. The structure LB thus combines a group of 250 structural elements of the sort SI. With four structures of the type of structure LB, the entire block of one thousand equipment numbers addressed by the search key KEY$_1$ can be described.

It is also possible to do without the time stamp in the assignment elements LTSST, RNGTSST 1 to RNGTSST 10, SLTSST 1 to SLTSST 60, and LBTSST 1 to LBTSST 250. This time stamp only serves to check the up-to-dateness of the assignment information.

It is also conceivable to do without the combination of structural elements into structures. All structural elements could be linked with the structure L1 by means of pointers, for example. The number of structural elements which are combined in the structures RNG, SL, and LB could also be chosen differently.

Accordingly, the procedure for determining that the equipment lists W, G, and B to which the equipment number MEI$_1$ is assigned is as follows:

With the algorithm ALG, the equipment number MEI$_1$ is mapped onto the search key KEY$_1$. The latter addresses a data set which is composed of the structure L1 and a variable number of structures of group L2. Through the resulting data structure, a variable number of different structural elements can be accessed with the search key KEY$_1$. These structural elements are searched for the equipment number MEI$_1$ until this number is found.

This procedure has the following advantage:

The description of the assignment of equipment numbers to the equipment lists W, G, and B by means of structural elements results in a high data compression. For example, a unit of one thousand equipment numbers can be assigned to one of the equipment lists W, G, and B by means of a single structural element of the sort KI. Moreover, through the use of search keys, the individual structural elements require only a three-digit number instead of a twelve-digit number to uniquely represent an equipment number. This, too, results in a considerable data compression.

The use of search keys has the added advantage of reducing the number of search steps required, since only that subset of the data set which is addressed by a search key needs to be searched.

In a second embodiment, a novel apparatus will be described which uses the novel method.

FIG. 4 shows a controller CONTR and a memory device MEM.

The memory device MEM holds a data set which describes the association of equipment numbers with three equipment lists. This data set is a set of structural elements which are linked with search keys, as in the example of FIG. 3.

The controller CONTR contains a converting device GEN, a comparator COMP, and an access device ACC.

A signal LREQ is applied to the converting device GEN. The converting device GEN sends data about a search key KEY to the access device ACC, and data about a shortened equipment number NUM to the comparator COMP. By means of the search key KEY, the access device ACC reads structural elements DAT from the memory device MEM, and it transfers the structural elements DAT to the comparator COMP. The comparator COMP sends a signal to the access device ACC and a signal LANSW in response to the signal LREQ.

The signal LREQ contains data about an equipment number and requests the controller CONTR to determine which of the three equipment lists the equipment number is assigned.

The converting device GEN maps the equipment number in the signal LREQ onto a search key KEY and a shortened equipment number NUM which specifies the position of the equipment number in the range of equipment numbers addressed by the search key KEY. The access device ACC receives the data about the search key KEY and accesses the area of the memory device MEM addressed by this key. There it sequentially reads the structural elements DAT associated with the search key KEY, and it transfers them to the comparator COMP. The comparator COMP checks by means of the shortened equipment number NUM whether the equipment number contained in the signal LREQ is identical with one of the equipment numbers described by the structural elements DAT. This is possible because all structural elements DAT are assigned to the range of equipment numbers addressed by KEY. If identity is determined, the comparator COMP will notify the access unit ACC, which then stops the reading of structural elements DAT from the memory device MEM. After that the access device ACC sends data via the signal LANSW which specify the equipment list searched for.

It is also possible to feed to the comparator COMP data about the search key KEY and the equipment number contained in the signal LREQ rather than data about the shortened equipment number NUM. The equipment numbers associated with the structural elements DAT would then be determined with the aid of the search key KEY and be compared with the equipment number contained in the signal LREQ.

I claim:

1. A method of determining an assignment of a mobile station ($ME_1$ to $ME_8$) to equipment lists (B, G, W) each containing a number of equipment numbers ($MEI_1$ to $MEI_8$) which are uniquely allocated to mobile stations ($ME_1$ to $MEI_8$), comprising the steps of:

assigning to each equipment number ($MEI_1$ to $MEI_8$) with the aid of an algorithm (ALG) a search key ($KEY_1$ to $KEY_p$; KEY) so that groups of equipment numbers ($MEI_1$ to $MEI_8$) correspond with a respective one of the search keys ($KEY_1$ to $KEY_p$; KEY), and covering with the respective one of the search keys ($KEY_1$ to $KEY_p$; KEY) a number of different structural elements ($S_1$ to $S_q$; DAT).

2. A method as claimed in claim 1, characterized in that the method includes the step of assigning with one sort (KI) of structural elements all equipment numbers ($MEI_1$ to $MEI_n$) addressable by a search key ($KEY_1$ to $KEY_p$; KEY) to one of the equipment lists (B, G, W).

3. A method as claimed in claim 1, characterized in that one sort (BI) of structural elements ($S_1$ to $S_q$; DAT) assigns an entire block of consecutive equipment numbers ($MEI_1$ to $MEI_n$) to one of the equipment lists (B, G, W).

4. A method as claimed in claim 1, characterized in that one sort (SI) of structural elements ($S_1$ to $S_q$; DAT) assigns a single equipment number ($MEI_1$ to $MEI_n$) to one of the equipment lists (B, G, W).

5. A method as claimed in claim 1, characterized in that like structural elements ($S_1$ to $S_q$; DAT) covered by the same search key ($KEY_1$ to $KEY_p$; KEY) are combined in structures (L1, RNG, SL, LB) of fixed length.

6. A method as claimed in claim 5, characterized in that if required, several like structures (L1, RNG, SL, LB) are linked together.

7. A method as claimed in claim 1, characterized in that the structural elements ($S_1$ to $S_q$; DAT) are assigned a time stamp which indicates when the data record specified by it was last renewed.

8. An apparatus for determining an assignment of a mobile station ($ME_1$ to $ME_n$) to equipment lists (B, G, W) containing a number of equipment numbers ($ME_1$ to $ME_n$) which are uniquely allocated to mobile stations ($ME_1$ to $ME_n$), said apparatus comprising a memory device (MEM) and a controller (CONTR) which is designed to determine, on request, data about the assignment of a mobile station ($ME_1$ to $ME_n$) to one of the equipment lists (B, G, W), characterized in that the memory device (MEM) stores structural elements ($S_1$ to $S_q$; DAT) linked by respective search keys ($KEY_1$ to $KEY_p$; KEY); and the controller (CONTR) has a converting device (GEN) for generating a search key ($KEY_1$ to $KEY_p$; KEY) from an equipment number ($MEI_1$ to $MEI_n$), has a comparator (COMP) for determining an association of the equipment number ($MEI_1$ to $MEI_n$) with a structural element ($S_1$ to $S_q$; DAT), and has an access device (ACC) for reading the structural elements ($S_1$ to $S_q$; DAT) from the memory device (MEM), said access device (ACC) having means to access each of the structural elements ($S_1$ to $S_q$; DAT) by means of a respective search key ($KEY_1$ to $KEY_p$; KEY).

* * * * *

UNITED STATES PATENT AND TRADEMARK OFFICE
CERTIFICATE OF CORRECTION

PATENT NO. : 5,561,853  
DATED : October 1, 1996  
INVENTOR(S) : Matthias Pfundstein Page 1 of 2

It is certified that error appears in the above-indentified patent and that said Letters Patent is hereby corrected as shown below:

At column 7, line 25, (claim), please delete "$MEI_8$" and insert --$ME_8$--; and INID Section [57]:

Please delete the abstract in its entirety, and insert:

--THE ABSTRACT OF THE DISCLOSURE

The invention provides an apparatus for determining an assignment of a mobile station ($ME_1$ to $ME_n$) to equipment lists (B, G, W) containing a number of equipment numbers ($ME_1$ to $ME_n$) which are uniquely allocated to mobile stations ($ME_1$ to $ME_n$). The apparatus includes a memory device (MEM) and a controller (CONTR) designed to determine, on request, data about the assignment of a mobile station ($ME_1$ to $ME_n$) to one of the equipment lists (B, G, W). The memory device (MEM) stores structural elements ($S_1$ to $S_q$; DAT) linked by respective search keys ($KEY_1$ to $KEY_p$; KEY). The controller (CONTR) has a converting device (GEN) for generating a search key ($KEY_1$ to $KEY_p$; KEY) from an equipment number ($MEI_1$ to $MEI_n$), has a comparator (COMP) for determining an association of the equipment number ($MEI_1$ to $MEI_n$) with a structural element

UNITED STATES PATENT AND TRADEMARK OFFICE
CERTIFICATE OF CORRECTION

PATENT NO. : 5,561,853
DATED : October 1, 1996
INVENTOR(S) : Matthias Pfundstein It is certified that error appears in the above-indentified patent and that said Letters Patent is hereby corrected as shown below:

($S_1$ to $S_q$; DAT), and has an access device (ACC) for reading the structural elements ($S_1$ to $S_q$; DAT) from the memory device (MEM). The access device (ACC) accesses each of the structural elements ($S_1$ to $S_q$; DAT) by a respective search key ($KEY_1$ to $KEY_p$; KEY).--

Signed and Sealed this

Third Day of June, 1997

*Attest:*

BRUCE LEHMAN

*Attesting Officer*     *Commissioner of Patents and Trademarks*